United States Patent [19]
Jardin et al.

[11] 3,913,970
[45] Oct. 21, 1975

[54] CLAMPING DEVICE FOR RIGID AUTOMOBILE SLIDING ROOFS

[75] Inventors: Hans Jardin; Robert Leiter; Alfons Lutz, all of Krailling, Germany

[73] Assignee: Webasto-Werk W. Baier KG, Stockdorf, Munich, Germany

[22] Filed: Apr. 9, 1973

[21] Appl. No.: 349,183

[30] Foreign Application Priority Data
Apr. 10, 1972 Austria .......................... 83067/72

[52] U.S. Cl. ................. 296/137 F; 49/451; 292/64; 292/65; 296/137 H
[51] Int. Cl.² ............................................. B60J 7/04
[58] Field of Search ......... 296/137 E, 137 F, 137 H, 296/137 G; 49/234, 451; 292/DIG. 46, 64, 65

[56] References Cited
UNITED STATES PATENTS
821,228   5/1906   Erb ........................................ 49/451

FOREIGN PATENTS OR APPLICATIONS
635,586   4/1950   United Kingdom ............ 296/132 F

*Primary Examiner*—Robert J. Spar
*Assistant Examiner*—Gary Auton
*Attorney, Agent, or Firm*—Joseph A. Geiger

[57] ABSTRACT

A clamping device for rigid automobile sliding roofs, where two longitudinally movable clamping rods carry downwardly extending, spring-biased clamping levers which, when moved against abutment members on the sliding roof panel, effect a vertical clamping action against a clamping track in the rain channel, and which also produce the raising and lowering motion of the sliding roof panel by engaging a stationary trip block.

14 Claims, 11 Drawing Figures

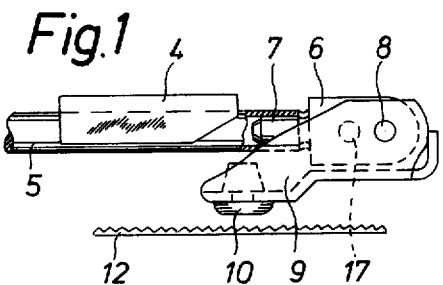
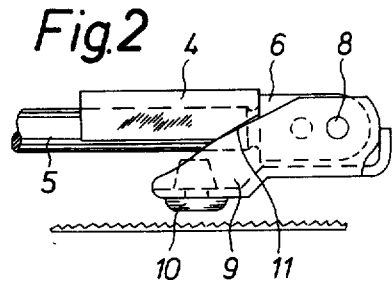
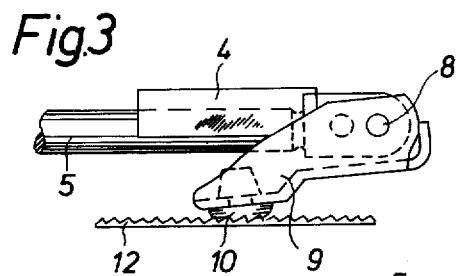
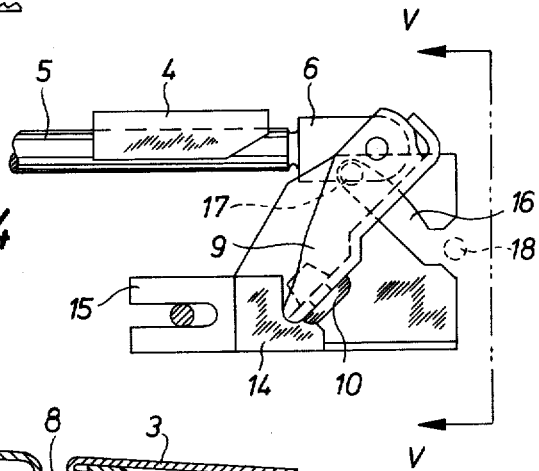
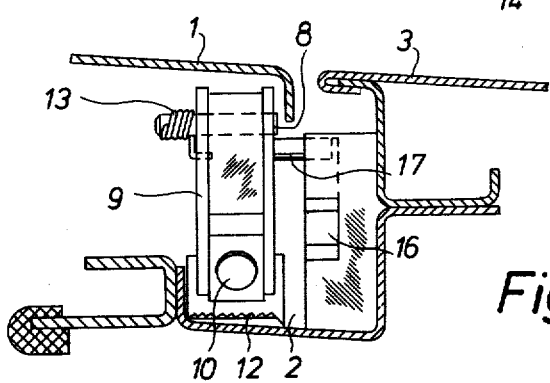

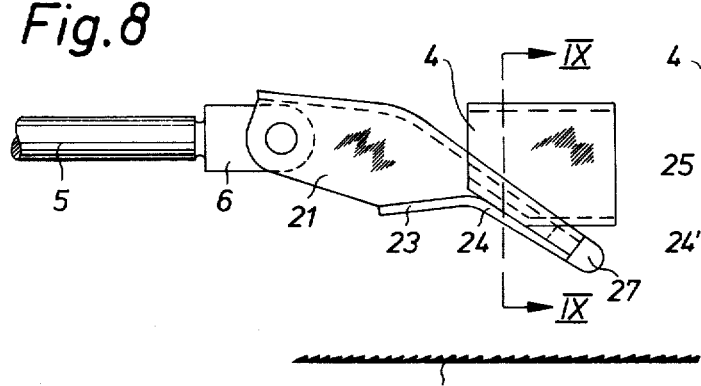
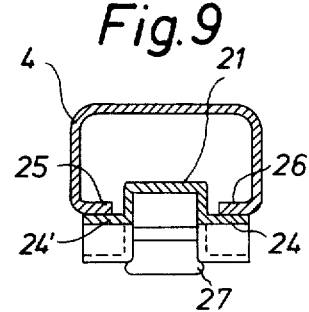
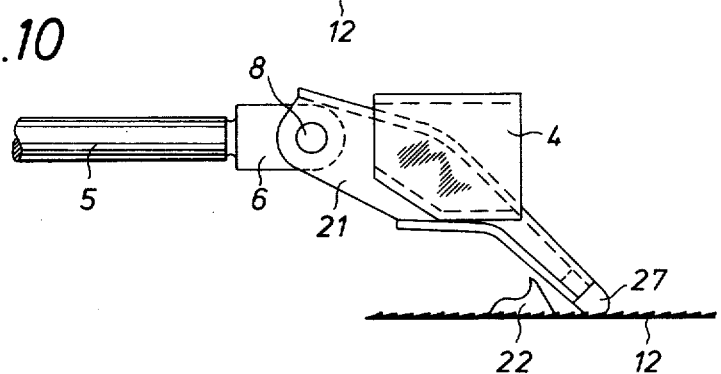
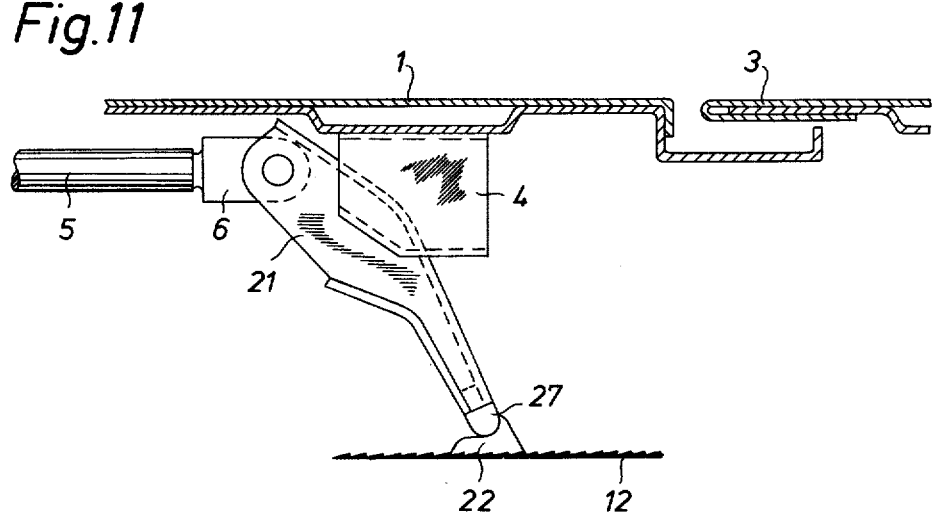

CLAMPING DEVICE FOR RIGID AUTOMOBILE SLIDING ROOFS

BACKGROUND OF THE INVENTION

1. Field of the Invention

The present invention relates to devices for the clamping of rigid automobile sliding roofs in various opening positions, and in particular to clamping devices of this kind which include a pair of longitudinally movable clamping rods, by means of which the clamping devices are actuated.

2. Description of the Prior Art

Clamping devices for automobile sliding roofs which use clamping rods for their actuation are known as such. However, they are complex in structure, and therefore expensive and subject to operational problems. One such prior art device includes an L-shaped clamping lever which is independently pivotable relative to the sliding roof panel, the pivot point being arranged near the corner of the "L", the connection with the clamping rod being on one end of the lever and the clamping member being arranged at the other end of the clamping lever. This solution is not only costly in production, but has the additional operational shortcoming that, when the clamping device is also used for raising and lowering of the rear portion of the sliding roof panel, different movement distaces of the clamping rods are necessary for the clamping of the panel on the one hand, and for the raising of the sliding roof panel into its closed position on the other hand. These differences in the clamping rod displacement represent an operational problem, unless one is willing to except a corresponding distortion of the clamping linkage in the clamping displacement which, of course, requires a considerably increased clamping force on the actuating handle of the sliding roof.

SUMMARY OF THE INVENTION

It is a primary objective of the present invention to overcome the aforementioned shortcomings by suggesting a simple and easily installed clamping device for rigid automobile sliding roofs which takes little effort to operate and which is also capable of raising and lowering the rear portion of the sliding roof panel to effect the opening and closing motion of the latter.

The invention proposes to attain the above objective by suggesting a clamping device of the kind mentioned, where the sliding roof panel carries an abutment member and where the clamping lever is carried by the clamping rod, the movement of the clamping rod and clamping lever against the abutment member causing the clamping lever to pivot into clamping position.

The device of the invention has the advantage of requiring only a single point of articulation, and hence of being inexpensive in production and very easy to install. An additional advantage of the device is the fact that it can be made adjustable in a very simple way, by providing a longitudinal adjustment of the abutment members.

In a preferred embodiment of the invention the abutment member is arranged at such a distance from the clamping member that a lost motion is necessary on the clamping rod, before engagement between the abutment member and the clamping lever is obtained. Thus, the clamping force to be exerted by the clamping linkage is only necessary in the last portion of clamping rod motion. This arrangement has the advantage that the longer clamping rod motion can be conveniently used to produce the raising and lowering motion on the rear portion of the sliding roof without the need of any linkage deflection or for two different linkage motions for either clamping or raising and lowering of the sliding roof panel. The lost motion arrangement in the clamping rod abutment member has the additional advantage of facilitating installation of the sliding roof and of permitting larger manufacturing tolerances.

The device of the invention preferable also includes a return spring on the clamping lever which normally maintains the latter at a distance above the clamping track, the spring having the additional advantage of preventing any rattling of the clamping device.

Another preferred feature of the invention relates to the control of the raising and lowering motion of the sliding roof panel which latter is accomplished by means of a trip block arranged in alignment with the clamping track of the stationary roof portion. This trip block, which is engaged by the free end of the clamping lever, causes the lever to pivot around its free end so as to lift the clamping rod and with it the sliding roof panel. This operation can still be further improved by providing a laterally extending guide pin on the clamping lever and a cooperating stationary return cam on the stationary roof portion. This additional guide arrangement prevents any possible rearward motion off the sliding roof panel before it is lowered out of the roof opening.

The device of the invention may be such that the clamping rod motion produces the clamping effect and panel closing motion by pulling on the clamping device, or it may be so arranged that a (rearward) pushing motion of the clamping rod produces the clamping effect and the raising motion, respectively, of the sliding roof panel. In the latter case the clamping lever forms an obtuse angle with the clamping rod axis, the angle being diminished by the clamping or panel raising operation. This embodiment has the advantage that it does not require the earlier-mentioned additional guide pin and return cam and it has the further advantage that, as the clamping rod is being pushed backward to effect the raising operation, the reaction force on the sliding roof panel pushes the latter against the forward edge of the roof opening, thereby assuring a good closure position edge of the roof opening, thereby assuring a good closure position of the panel against the opening.

In the embodiment in which the clamping rod is pulled to effect the raising motion of the sliding roof panel, the operation can be still further improved by providing a short vertical link in connection with the clamping lever, the link carrying the rear portion of the clamping rod with the clamping lever. This arrangement eliminates any tendencies of the sliding roof cover to move inadvertently while the clamping rods are moved to effect the clamping or raising of the sliding roof panel.

The invention lastly suggests that the preferred embodiment of the clamping device includes a clamping rod of tubular form into which is pressed the head which carries the pivot shaft for the clamping lever, the rod and head being secured together by swaging.

BRIEF DESCRIPTION OF THE DRAWINGS

Further special features and advantages of the invention will become apparent from the description following below, when taken together the accompanying drawings which illustrate, by way of example, several embodiments of the invention, represented in the various figures as follows:

FIG. 1 shows in a longitudinal elevation, partially in cross section, a portion of the clamping rod and clamping lever attached thereto in the fully released position, as a first embodiment of the invention;

FIG. 2 shows the device of FIG. 1 in the initial abutment position just prior to the clamping motion;

FIG. 3 shows the device of FIG. 1 in the clamped position;

FIG. 4 shows the device of FIGS. 1-3 in the position in which the sliding roof panel is raised and closed against the stationary roof portion;

FIG. 5 is a partial transverse cross section through the stationary roof portion and the right-hand side of the sliding roof panel, taken along line V—V of FIG. 4;

FIG. 8 shows a third embodiment of the invention in an elevational view, the clamping device being arranged for a different clamping rod motion;

FIG. 9 shows the device of FIG. 8 in a transverse cross section along line IX—IX of FIG. 8;

FIG. 10 shows the device of FIG. 8 in its clamped position; and

FIG. 11 shows the device of FIG. 8 with the sliding roof panel in its raised position.

DESCRIPTION OF THE PREFERRED EMBODIMENTS

Figure 6:
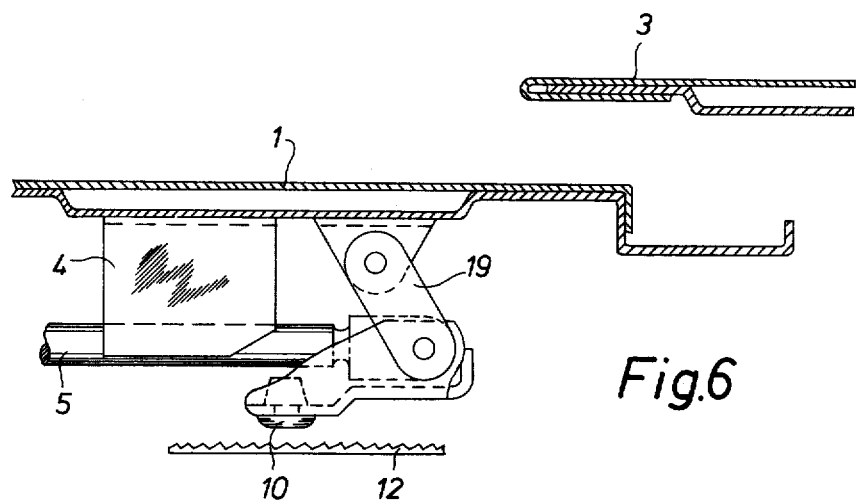
FIG. 6 shows in a longitudinal cross section a modified embodiment of the invention with the clamping device in its released position.

In each of the several preferred embodiments of the invention, the suggested clamping device is provided in pairs, i.e., a longitudinal clamping rod and a clamping device is arranged on each side of the sliding roof panel. Thus, although the drawings show only one rod and one clamping device for each embodiment, it should be understood that a second, identical device is provided in each case on the opposite side of the sliding roof panel. The two clamping rods are actuated simultaneously, the actuating mechanism itself being not the subject of this invention. An improved version of such an actuating device is disclosed in application Ser. No. 349,184, filed Apr. 9 1973, now U.S. Pat. No. 3,857,603.

A first embodiment of the invention, illustrated in FIGS. 1-5, shows a sliding roof panel 1 arranged inside the opening of the stationary roof portion 3 of an automobile roof (FIG. 5), a clamping device being attached to each side of the sliding roof panel 1 in the area of the rain channel 2. A hollow clamping rod 5, of which only the rear portion is shown in FIGS. 1-4, is longitudinally guided on the sliding roof panel and movable relative thereto by means of the aforementioned actuating mechanism. Thus, any raising or lowering of the rear portion of the clamping rod as a result of the movement of the attached clamping lever 9, also raises or lowers the rear portion of the sliding roof panel 1, under which the clamping device is mounted. In the embodiment of FIGS. 1-5 the longitudinal motion of the clamping rods is so arranged that the forward motion of the latter relative to the sliding roof panel produces either a clamping motion or a raising motion of the sliding roof panel, the latter in the case where the roof panel 1 is aligned with the roof opening.

Each clamping rod 5 carries on its rear end a head 6 which includes a stud extension 7 firmly connected to the tubular end of clamping rod 5. The head 6 carries a pivot 8 for the clamping lever 9 which is thereby pivotally attached to the rear end of clamping rod 5. The clamping lever 9 carries on its lower free end a resilient clamping member 10 which is adapted for engagement with the clamping track 12 in the rain channel 2 of the stationary roof portion (FIG. 5). The clamping rod 5 with the clamping lever 9 attached thereto is longitudinally movable relative to the sliding roof panel and relative to an abutment member 4 which is attached to the latter. A forward motion of the clamping rod, therefore, forces the clamping lever 9 against the abutment member 4, as shown in FIG. 2, an inclined surface on the abutment member 4 engaging a cam surface 11 on the clamping lever 9. The lever 9 is thereby pivoted around its pivot axis 8 until the clamping member 10 on the tip of lever 9 engages the clamping track 12 (FIG. 3). The pressure of the clamping member 10 against the clamping track 12 produces a lift reaction on the sliding roof panel. However, as the panel is normally guided against upward motion in the area to the rear of its closed position, i.e., when the panel is partially or fully retracted, this upward pressure produces a clamping effect on the sliding roof panel in any opening position. Panel guides of the type mentioned are disclosed in German Patent No. 1,029,691, for example, especially in FIG. 3 and FIG. 4 thereof. The sliding roof panel 1, when clamped in this manner, prevents any movement of the sliding roof panel from the outside so as to be safe against tampering with the partially closed sliding roof. It also maintains the sliding roof panel in position against any wind pressure or against any rattling tendencies.

The clamping device can be released by simply reversing the motion of the clamping rods, rearward motion of rod 5 having the effect of disengaging the clamping lever 9 from the abutment member 4. A return spring 13 (FIG. 5) lifts the clamping lever 9 from the clamping track 12 so that it will not rub against the latter or be accidentally caught during forward motion of the sliding roof panel. The return spring 13 (not shown in FIGS. 1-4 for the sake of clarity) additionally serves the purpose of preventing any rattling of the clamping lever 9 against the head 6.

Figure 7:
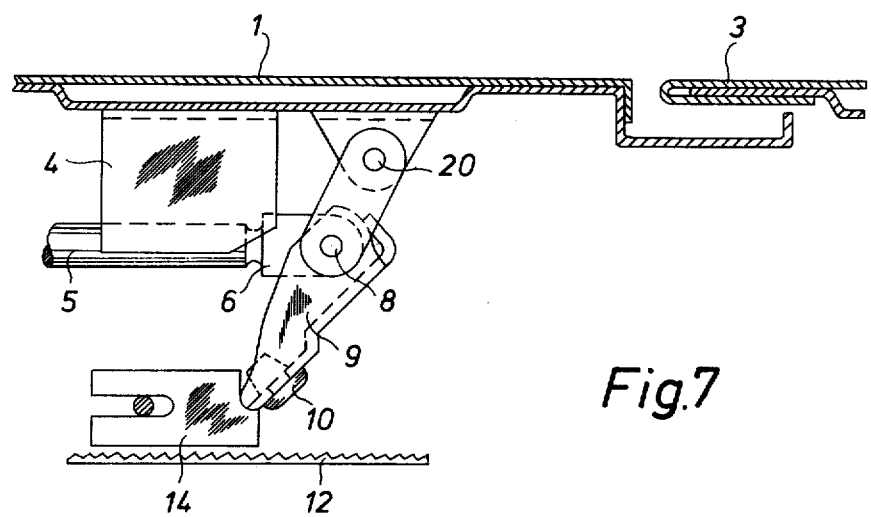
FIG. 7 shows the embodiment of FIG. 6 in the position in which the sliding roof panel is in its raised, i.e. closed position.

The same clamping rod 5 and clamping lever 9 also perform the operation of raising the rear portion of the sliding roof panel when the latter is to be closed against the roof opening (compare FIGS. 6 and 7). For this purpose, the device of the invention further includes a trip block 14 mounted on the stationary roof portion in alignment with the travel path of the clamping lever 9. The longitudinally position of trip block 14 is adjustable by means of an adjustment member 15. Its position is so arranged that, when the sliding roof panel has been moved forward into alignment with the roof opening, the tip of the clamping lever 9 engages a matching cradle in the trip block 14, the lever tip and block cradle thus becoming a pivot center for the clamping lever 9 and the attached clamping rod 5. A forward movement of the clamping rod 5 thus displaces the pivot axis 8, raising it along an arc around the cradle of the trip block 14, the clamping rod 5 raising with it the sliding roof panel 1 until the latter is closed against the roof opening. It should be understood, of course, that the previously mentioned guides for the sliding roof panel, which are operative in clamping the sliding roof panel in any retracted position, have to have released the rear portion of the sliding roof panel 1, when the latter has reached its alignment position underneath the roof opening.

In the embodiment of FIGS. 1–5, the proper raising and lowering of the sliding roof panel by means of the pivoting of clamping lever 9 around the trip lock cradle is checked by means of an additional laterally extending guide pin 17 on the outer side of the clamping lever 9 (FIG. 5) which engages a return cam 16 inside a block mounted in the stationary roof portion. The purpose of this guide pin and return cam is to prevent any inadvertent rearward motion of the sliding roof panel from its closed position before its rear portion is lowered out of the opening. Such a condition could occur if the clamping rods 5 encounter a high frictional resistance against rearward motion relative to the sliding roof panel 1 at the beginning of the opening, i.e. release motion. The guide pin 17 engaging cam 16 forcibly pivots the clamping lever 9 upwardly, as soon as the rearward motion of the clamping rod is initiated.

A second embodiment of the invention is illustrated in FIGS. 6 and 7, where the head 6 of the clamping rod 5 not only carries the clamping lever 9, but is pivotally suspended against the sliding roof panel 1 by means of a short link 19 engaging a pivot pin 20 on panel 1. This arrangement eliminates the need for any sliding guide on the rear portion of the clamping rod 5, thereby reducing operational friction. The arcuate motion of the pivot center 8, instead of the previous straight-line motion, is of no importance for the operation of the device. In addition to facilitating the longitudinal motion of the clamping rod 5 through the elimination of the longitudinal guide on the rear portion of the sliding roof panel, this arrangement assures that the sliding roof panel does not inadvertently move in the opposite direction from the clamping rod 5 when the raising motion is initiated. Such an inadvertent rearward displacement of the panel during the raising motion could occur as a result of the friction force on the panel from the forward motion of the clamping rods 5 relative to the sliding roof panel 1. The acute angle between the clamping rod 5 and the fully retracted clamping lever 9 thus may be chosen to be very small, thereby reducing the overall height of the sliding roof structure.

A third embodiment is shown in FIGS. 8–11 of the drawing. Here, the clamping rods 5 are arranged to move rearwardly for the clamping and raising operations. The clamping lever 21 in this case, instead of forming an acute angle with the clamping rod 5 as in the previous embodiments, forms an obtuse angle there with. The principle of operation is similar to that of the previously described embodiments: the clamping lever 21 moves against an abutment member 4 on the sliding roof panel 1, thereby deflecting the clamping lever downwardly either against the clamping track 12 to effect clamping, or against a stationary trip block 22, in which case the clamping rod 5 and the sliding roof panel 1 are lifted to effect the closing operation. For the clamping operation, the clamping lever 21 has two differently inclined cam surfaces 23 and 24 which engage the abutment member 4. As can be seen in the cross section of FIG. 9, these cam surfaces 23 and 24 are provided on each side on the clamping lever 21 so as to stabilize the latter in its clamped position in which the centrally arranged clamping end 27 is urged against the clamping track 12 (FIG. 10). Only when the sliding roof panel 1 is aligned underneath the roof opening, does a rearward motion of the clamping rod 5 not produce clamping of the panel, the lever end 27 engaging in this case the trip block 22, thereby providing a pivot center around which the head 6 and clamping rod 5 are raised to close the sliding roof panel. The rearward motion of the clamping rod 5 during the raising motion produces a forward-directed reaction force on the sliding roof panel 1, thereby maintaining the latter firmly against the forward edge of the roof opening so as to assure the proper positioning of the sliding roof panel in the opening.

The present invention is not intended to be limited to the embodiments illustrated in the drawings. Thus, it is not absolutely necessary that the clamping tracks 12 be arranged in the bottom of the rain channels 2. They might just as well be arranged on the sides of the roof opening frame, for example, especially in the case where the clamping levers do not also serve as the levers for raising the rear portion of the sliding roof panel. The latter version would have the advantage that the sliding roof panel guides are not essential for obtaining the clamping of the sliding roof panel in its various opening positions.

It should also be understood that the foregoing disclosure describes only preferred embodiments of the invention and that it is intended to cover all changes and modifications of these examples of the invention which fall within the scope of the appended claims.

What is claimed is:

1. In an actuating mechanism for rigid automobile sliding roofs, especially for roofs of the type which require the lowering and raising of the rear portion of the sliding roof panel in the opening and closing procedure, where a clamping rod is arranged on each side of the sliding roof panel, the clamping rod being mounted and guided thereon for longitudinal forward and rearward motion relative to the sliding roof panel, and where a linkage and actuating handle cooperate with the two clamping rods so as to effect their forward and rearward motions, and the actuating handle inclues means for locking the linkage in at least one position;

the combination thereof with a clamping device on each clamping rod, each comprising in combination:

a clamping lever pivotally attached by one end to the clamping rod and so oriented that the lever radiant, defined by a line connecting its pivot point with the free end of the lever, extends from said point of attachement at an angle in relation to the clamping rod axis;

means for biasing the clamping lever so as to urge its free end toward the clamping rod axis;

an abutment member attached to the sliding roof panel in the motion path of the clamping lever, the abutment member being so arranged that a longitudinal displacement of the clamping rod and clamping lever causes the latter to be pivoted away from the clamping rod axis against the biasing means; and a clamping track on the stationary part of the roof structure facing the path of the free end of the clamping lever in the various positions of the latter in correspondence with different opening positions of the sliding roof panel, the clamping track cooperating with the free end of the clamping lever to produce a clamping effect on the sliding roof panel, when the clamping lever is forced against the abutment member.

2. A device as defined in claim 1, wherein:
the sliding roof panel is of the kind which is openable by lowering its rear portion and by subsequently moving it rearwardly under the stationary roof portion;
the sliding roof panel is restrained vertically by the stationary roof structure, against lifting forces on its rear portion, in all positions to the rear of the position in which said panel is alinged with the roof opening;
the clamping lever is arranged near the rear end of the sliding roof panel so as to be pivotable around a transverse horizontal pivot on the clamping rod, the free end of the lever being positioned below the clamping rod and biased upwardly by the biasing means; and
the clamping track is arranged below the path of the free clamping lever end in such a way that a vertical clamping action is obtained between the clamping track and the clamping lever, and between the rear portion of the sliding roof panel and the stationary roof structure, when the clamping lever is forced against the abutment member.

3. A device as defined in claim 2, wherein:
the biasing means is a spring urging the free end of the clamping lever upwardly toward the clamping rod axis; and
the clamping lever includes means for determining the highest position of the clamping lever relative to the clamping rod so that the free end of the lever is normally maintained at a distance above the clamping track, but below the lever pivot point so as to maintain an angle between the clamping lever and the clamping rod axis.

4. A device as defined in claim 3, wherein:
the clamping rod and the clamping lever radiant form an acute angle in their normal, released position, the free end of the clamping lever being positioned forward of the clamping lever pivot point.

5. A device as defined in claim 3, wherein:
the clamping rod and the clamping lever radiant form an obtuse angle in their normal, released position, the free end of the clamping lever being positioned to the rear of the clamping lever pivot point.

6. A device as defined in claim 3, further comprising:
a trip block mounted on the stationary part of the vehicle in such a position relative to the clamping lever that the latter, in its normal, released position, engages the trip block with a downwardly extending extremity to form a pivot therewith when the sliding roof panel is advanced into an alignment position with the roof opening; and wherein:
the clamping lever position relative to the clamping rod and relative to the abutment member is such that a clamping rod motion substantially identical to the one which affects the vertical clamping of the sliding roof panel in the various retracted panel positions causes the rear portion of the sliding roof panel to be raised into its closed position by the action of the clamping lever against the trip block pivot.

7. A device as defined in claim 6, wherein:
the free end of the clamping lever is also the downwardly extending extremity which cooperates with the trip block to raise the rear portion of the sliding roof panel.

8. A device as defined in claim 7, wherein:
the clamping track is arranged a small distance below the normal, released position of the free end of the clamping lever; and
the abutment member is arranged at a distance from the clamping lever so as to require an initial lost motion of the clamping rod in order to accommodate sufficient clamping rod travel for the raising of the sliding roof panel into its closed position.

9. A device in claim 6, wherein:
the clamping rod axis and the clamping lever form an obtuse angle in their normal, released position, the free end of the clamping lever being positioned to the rear of the lever pivot;
the trip block is positioned below the level of the free clamping lever end when the latter is in its normal, release position;
the abutment member is arranged above the clamping lever and to the rear of the clamping lever pivot point; and
the clamping lever and the abutment member engage each other via cooperating cam surfaces.

10. A device as defined in claim 9, wherein:
the cooperating cam surface between the clamping lever and the abutment member include, in the sense of clamping rod movement from the released position to the clamped position, a first cam surface portion which rapidly lowers the free end of the clamping lever toward the clamping track, and a second cam surface portion which gradually affects the clamping engagement of the clamping lever against the clamping track.

11. A device as defined in claim 6, further comprising:
a return cam mounted on the stationary part of the roof structure; and wherein:
the clamping lever includes a laterally protruding guide member; and
the return cam is so arranged in relation to the guide member of the clamping lever that, when the sliding roof panel is lowered out of the roof opening through a relase motion of the clamping rod, the clamping lever is forced to pivot around the trip block pivot so as to lower the rear portion of the sliding roof panel, before the latter can move rearwardly under the stationary roof structure.

12. A device as defined in claim 1, wherein:
each clamping rod includes a vertical link connected to its rear portion by one end and to the sliding roof panel by its other end, the link thus providing a guide for the rear portion of the clamping rod.

13. A device as defined in claim 12, wherein:
the connecting point between the vertical link and the clamping rod coincides with the pivot point of the clamping lever on the clamping rod.

14. A device as defined in claim 1, wherein:
the clamping rods are tubular;
each rod includes a head with a stud extension by means of which it fixedly engages the tubular rear end of the clamping rod; and
the pivots for the clamping levers are arranged in the clamping rod heads.

* * * * *